S. G. NEAL.
SELF SEATING AND SELF CLOSING VALVE.
APPLICATION FILED MAR. 3, 1909.
951,378.
Patented Mar. 8, 1910.
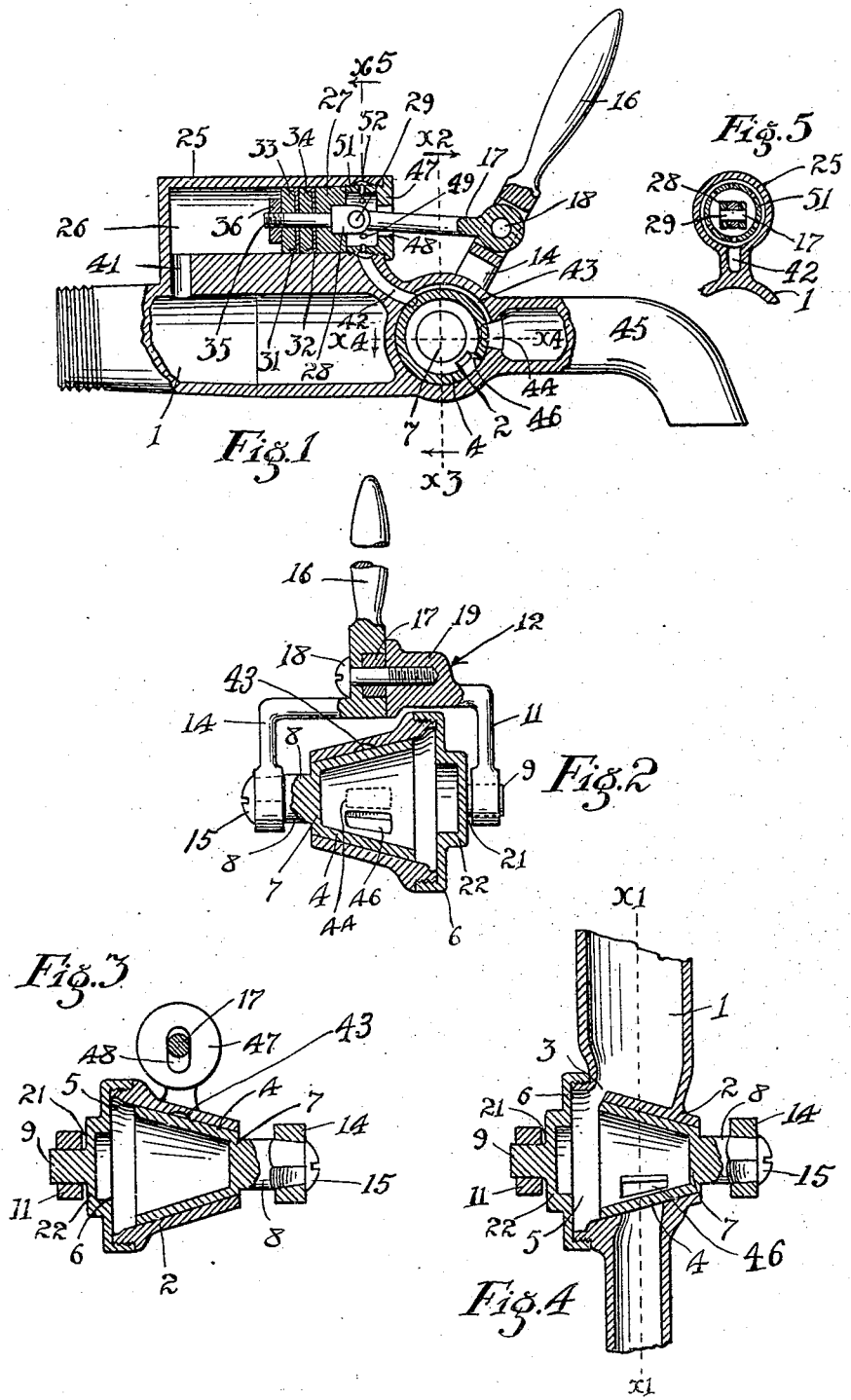

UNITED STATES PATENT OFFICE.

SPENCER G. NEAL, OF LOS ANGELES, CALIFORNIA, ASSIGNOR TO CALIFORNIA VALVE AND AIR BRAKE COMPANY, OF PALMS, CALIFORNIA, A CORPORATION OF CALIFORNIA.

SELF-SEATING AND SELF-CLOSING VALVE.

951,378.  Specification of Letters Patent.  Patented Mar. 8, 1910.

Application filed March 3, 1909. Serial No. 481,191.

*To all whom it may concern:*

Be it known that I, SPENCER G. NEAL, a citizen of the United States, residing at Los Angeles, California, have invented a new and useful Self-Seating and Self-Closing Valve, of which the following is a specification.

Objects of this invention are to provide a valve that will perfectly seat itself under all conditions, to provide a self-closing valve which operates with so little friction that the valve closes automatically by a low degree of fluid pressure, to provide, in combination with a self-seating valve, means whereby the fluid pressure automatically closes said valve; and to provide improved self-closing means adapted for use in combination with valves in general.

A further object of this invention is to provide a self-closing device of an inexpensive and practical construction adapted to be employed in combination with faucets in general use in houses and offices wherever a self-closing faucet is required.

Referring to the accompanying drawings which illustrate the invention:—Figure 1 is a side view of the valve partly in section and partly in elevation. Line $x^1$ of Fig. 4 indicates the line upon which the sectioned portion of the view is taken. Fig. 2 is a section of the valve on line $x^2$—$x^3$ of Fig. 1, looking in the direction of the upper arrow. Fig. 3 is a section on line $x^2$—$x^3$ of Fig. 1 looking in the direction of the lower arrow. Fig. 4 is a transverse broken section on line $x^4$ of Fig. 1. Fig. 5 is a detail cross-section on line $x^5$ of Fig. 1.

Referring in detail to the drawings,—the supply conduit 1 has formed therein a valve casing 2 having an internal frusto-conical seat, said supply conduit being in constant communication with the large end of said seat through an elongated passage 3 shown in Fig. 4. Within said valve casing 2 is rotatively fitted a hollow frusto-conical valve plug 4 of less length than the seat of the valve casing to provide a clearance within tubular extension 5 which is covered by cap 6 screwed on to the large end of the valve casing. The small end of the valve casing is left open to provide an unobstructed space at that end of the valve seat to permit the plug to project and thus take up the wear thereof upon the seat. The small end of plug 4 is provided with a closure or end wall 7 from which projects an operating stem 8. At the other end of the valve, the cap 6 is provided with a trunnion or lug 9 upon which is rotatively fitted one arm 11 of a yoke 12, the other arm 14 of said yoke being non-rotatively fitted to the squared end of stem 8 and held in place by the usual screw 15. From the yoke 12 projects an operating handle 16 desirably formed as an extension of the arm 14. Through the base of the operating handle 16, which is slotted for the purpose, projects the apertured end of a connecting-rod 17. Through the base of the handle and through the aperture in the end of said connecting-rod extends a retaining screw 18 which is screwed into an internally threaded bore formed in an enlargement 19 with which the arm 11 of the yoke is provided at the other side of the operating handle. A clearance 21 is provided between the end of arm 11 and a boss 22 with which cap 6 is provided, in order to allow the arm 11 room to shift toward the small end of the valve casing to take up the wear when plug and seat have become worn.

The conduit 1, on the side of the valve nearest the supply, is provided with a casing 25 containing a piston chamber 26, said piston chamber extending parallel with and adjacent to conduit 1. Within said piston chamber is a piston 27 operatively connected with the connecting-rod 17 by means of the head 28 and pin 29. The piston is desirably provided with two cup-leathers 31 and 32, held in place by followers 33 and 34. Upon piston-rod 35 is screwed the retaining nut 36 to hold said followers and cup-leathers in place.

At the end of the piston chamber nearest the supply is an inlet passage 41 to allow the fluid pressure to enter that end of the piston chamber. At the other end of the piston chamber is an outlet or leakage passage 42 which leads to a segmental groove 43, with which the valve seat is provided, said groove leading to an outlet casing port 44, communicating with the discharge spout 45. 46 designates the outlet port of the plug which coöperates with said casing port 44.

There is always communication between the supply and the interior of the valve plug by way of inlet passage 3, and the valve plug is therefore held by fluid pressure from the supply snugly to its conical seat. The operating arm 16 is desirably placed about the mid-length of the valve so as to be substantially at the center of the area of friction between the valve plug and its seat. The outlet port 46 is formed as an opening leading radially through the wall of the valve plug and is preferably made considerably greater in length than width so that the valve may be opened and closed by a slight rotation of the plug.

To open the valve the handle 16 is moved in a direction to force the piston to the left from the position shown in Fig. 1, thus bringing the ports 44 and 46 into register and allowing the fluid which enters the large end of the plug through passage 3 to escape through the ports 46 and 44 and out spout 45. When the handle is released the fluid pressure back of the piston moves the handle and plug in the reverse direction and closes the valve. The end of the piston chamber 26 nearest the spout is provided with a partial closure or cap 47 which is furnished with an operating opening 48 and a vent 49 communicating with the leakage passage 42. The cap is provided with an internally projecting sleeve 51 against which the piston 27 abuts when the valve is closed thus preventing leakage from the piston at such time. What little leakage may occur during operation and when the valve is open is carried to the discharge through the vent 49, leakage passage 42 and groove 43. No leakage, however, will occur except in case the cup-leathers become worn. There are a plurality of the vent openings 49 arranged circumferentially around the sleeve 51, and an internal groove 52 is provided within the piston chamber 26 radially in line with said vent openings so that any leakage from the piston will find its way through such of the vent openings 49 as happen to be lowermost when the cap 47 has been screwed down. The sleeve 51 forms a stop to stop the rotation of the valve plug when port 46 has been moved sufficiently below the casing port 44 to cut off the discharge, and also a seat to prevent leakage from the piston chamber when the valve is closed.

The radial inlet port 3 leads into the frusto-conical seat of casing 2 near the large end thereof. The tubular extension 5, onto which cap 6 screws, is confined to the portion of the casing beyond said radial port, and the large open end of the plug terminates a sufficient distance from the large end of the seat to leave said port unobstructed.

What is claimed is:

1. In combination, an inlet conduit terminating in a spout portion, a valve casing in said conduit extending transversely thereto, a hollow valve plug rotatively fitting said casing, a piston casing extending along one side of said conduit, said piston casing having an inlet port at its rear end communicating with said conduit, a connecting rod pivoted to the front end of said piston, and a radial operating handle for said plug, said handle being connected with the front end of said connecting rod, said valve plug being open when the operating handle is at one limit of its travel and closed when the handle is at the other limit of its travel.

2. In combination, an inlet conduit terminating in a spout portion, a valve casing in said conduit extending transversely thereto, a hollow valve plug rotatively fitting said casing, a piston casing extending along the upper side of said conduit, said piston casing having an inlet port at its rear end communicating with said conduit, a connecting rod pivoted to the front end of said piston, and a radial upwardly extending operating handle for said plug, said handle being connected with the front end of said connecting rod, said valve plug being open when the operating handle is in the rearward position and closed when the handle is in the forward position.

3. In combination, a conduit, a casing formed at one side thereof and containing a piston chamber extending substantially parallel thereto and having its rear end in communication with said conduit, a piston in said chamber, a valve casing in said conduit extending transversely thereto between said piston chamber and the outlet of said conduit, a rotary valve plug in said valve casing, there being a leakage passage open to the atmosphere leading from the forward end of said piston chamber to said valve chamber and around between the valve plug and the wall of said valve chamber to a point in front of said valve plug, and means operatively connecting said valve plug with said piston.

4. In combination, an inlet conduit terminating in a spout portion, a valve casing in said conduit extending transversely thereof, a hollow valve plug rotatably fitting in said casing, a cylinder extending along the upper side of said conduit having a passage at its rear end communicating with the conduit and a leakage-passage at its front end communicating with the conduit at a point in front of the valve, a piston working in said cylinder, a cap screwed into the front end of said cylinder and serving as a stop to the piston, said cap being provided with radial holes communicating with said leakage-passage, a rod connected to the piston and working through a hole in said cap, and operating means connecting the forward end of said rod to the valve plug.

5. In combination, a conduit terminating in a spout portion, a valve casing in said conduit extending transversely thereof, a valve plug rotatably fitting said casing, a piston casing extending along the upper side of said conduit having an inlet port at its rear end communicating with said conduit and also a leakage port at its forward end extending to said valve casing and around between the wall of the same and the valve plug to a point in advance of the valve plug, a piston working in said piston casing between said ports, an upwardly extending handle attached to said valve plug, and a rod connecting said handle to said piston through the front end of the piston casing, for the purposes set forth.

6. In combination, an inlet conduit terminating in a spout-portion, a frusto-conical casing extending transversely of said conduit and having one end closed and the other end open, a hollow frusto-conical valve-plug fitting within said casing and having one end extending out through the open end thereof, a piston-casing extending along one side of said conduit and having an inlet port at its rear end communicating with said conduit, a piston in said casing, a connecting rod pivoted to the front end of said piston, and a radial operating handle attached to the projecting end of said plug and being connected to the front end of said connecting rod, said valve-plug being open when the operating handle is at one limit of its travel and closed when the handle is at the other limit of its travel.

In testimony whereof I have hereunto signed my name in the presence of two subscribing witnesses at Los Angeles, in the county of Los Angeles and State of California, this 24th day of February 1909.

SPENCER G. NEAL.

Witnesses:
W. H. SHEASBY,
ALBERT H. MERRILL.